United States Patent Office 3,296,308
Patented Jan. 3, 1967

3,296,308
PREPARATION OF SUBSTITUTED THIOPHENOLS FROM AROMATIC THIOLS
Derek Walker, Boulder, Colo., and Joseph Leib, Montreal, Quebec, Canada, assignors to Dominion Tar and Chemical Company Limited, Montreal, Quebec, Canada
No Drawing. Filed Apr. 6, 1965, Ser. No. 446,117
9 Claims. (Cl. 260—591)

This application is a continuation-in-part of application, Serial No. 127,144, filed July 27, 1961, now abandoned.

This invention relates to the prepartion of substituted aromatic thiophenols. More particularly, the invention is directed to preparing derivatives of aryl thiols which occur as by-products of the aromatisation of certain petroleum streams.

Up to now, substituted aryl thiols have only been prepared by the use of roundabout methods, viz., by first introducing onto the ring of the aromatic compounds the desired substituents and then introducing the thiol function. Attempts to introduce desired substituents onto the ring of an aromatic compound already having the thiol function were frustrated by the preference which the substituting agents generally have for the S-atom and which results in an attack on the thiol function instead of on the ring.

Applicants have unexpectedly found that substituted aryl thiols can be derived from the corresponding non-substituted or less-substituted aromatic thiol by first blocking the thiol function through the addition of a suitable S-protective group, such group being removable with relative ease thereafter, then introducing the desired substituent or substituents onto the ring by a reaction with a substituting agent, and finally removing the S-protective group by oxidative acid-catalyzed hydrolysis thereby to regenerate the thiol.

In accordance with the invention an aromatic thiol of the general formula

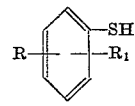

(A)

wherein $R_1$ is hydrogen or lower alkyl, is first reacted with a compound of the formula

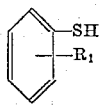

(B)

wherein Z represents a halogen, X represents hydrogen or an alkyl or aryl, and Y is an electron-withdrawing radical selection from the group consisting of COOR', COR'' and CN, wherein R' represents a hydrogen or a lower alkyl and R'' represents a lower alkyl, thereby to form a compound of the formula

(C)

wherein $R_1$, X and Y are defined above. Compound (C) is then reacted with a substituting agent thereby to introduce onto the ring a radical R of the group consisting of halogen, a carboxyacyl and a chloromethyl, thus forming a compound of the formula

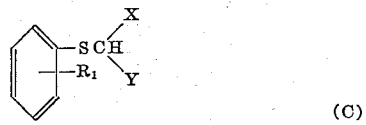

(D)

wherein R, $R_1$, X and Y are as defined above, and compound (D) is then subected to an oxidative acid-catalyzed hydrolysis thereby to remove the radical of compound (B) and to reconstitute the thiol, and thus to obtain the final product of the formula

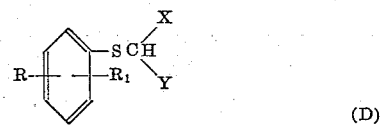

(E)

wherein R and $R_1$ are as defined above.

Thus, starting with compound (A), the present process permits the preparation of compound (E) having a substituent on the ring. Compound (A) may itself be a ring-substituted compound, in which case R is only an additional substituent. Such additional substituent can be introduced, by the present method, only in positions para or ortho and the starting compound (A) will thus be an aromatic thiol unsubstituted in para or otho. The metal salt of compound (A) can equally be used.

The first step of the persent method, viz. the blocking of the thiol function, is carried out by reacting the aromatic thiol with a compound such as a relatively low molecular weight α-chloro-alkanoic acid, or a lower molecular weight α-chloro-ketone, or a lower molecular weight α-chloro-nitrile. Thus, a phenyl-mercaptan is reacted with chloro-acetic acid in a solution containing excess alkali to form phenyl-mercapto-acetic acid. The presence of an electron-withdrawing grouping, such as —COOH, COR or CN, in position β to the sulfur atom, affects the stability of the bond between the sulfur and the alkyl carbon to the point where it can be broken in a subsequent step without great difficulty.

The substitution on the ring can be carried out by various methods, some of them known. Thus, halogenation will be carried out by the direct action of the respective halogen on the aromatic compound, acylation will be carried out by the Friedel-Crafts methods, chloromethylation by the action of such agents as formaldehyde and hydrochloric acid, and the like. Various other radicals may be introduced on the ring and the procedure will vary depending on the substituent.

The resulting substituted compound is then subjected, in a third step, to an oxidative acid-catalyzed hydrolysis the effect of which is to split the S-C bond, remove the protective group and thereby restore the thiol. The oxidizing agent for use in this step may be selected from the group consisting of hydrogen peroxide, potassium permanganate, potassium dichromate, nitric acid and halogens. The quantity of oxidizing agent for good yields is in the neighborhood of 1½ mols based on the sulphide. Organic or inorganic acids may be used as catalysts; thus, hydrochloric, sulphuric, phosphoric, acetic acids have all provided suitable.

The regenerated thiols, when they are steam-volatile, may be removed by steam, as soon as they are formed. It is, however, possible to vary the final product and obtain a disulphide instead of a thiol. Thus, by using higher amounts of the oxidizing agent, e.g. two mols or more, based on the sulphide and by using reflux conditions instead of steam distillation, it is possible to obtain the corresponding disulphide. Similarly, by using even larger relative amounts of the oxidizing agent and by carrying out the final part of the reaction in a homogeneous phase, e.g., in concentrated acetic acid as a solvent, the corresponding aryl-thioarylsulphonates will be formed.

This process permits the production, as an end products, of a wide range of substituted arylthiols and thus provides possibilities for utilizing the vast quantities of aromatic thiol compounds occurring in the waste products of certain petroleum refining operations. But it is also possible to obtain valuable products by stopping at an intermediate stage of the process and isolating the products formed. It is thus possible to produce arylmercaptoacyloxyacetic acids, or di(arylmercapto) acetic acids and arylmercaptohaloacetic acids, or as a product of further oxidation of the arylthiol, diaryl disulphides and arylthioarylsulphonates. Thus, arylmercaptoacyloxyacetic acids may be prepared in one step by oxidizing a solution of an arlymercapto acetic acid in the esterifying acid or a mixture of the acyloxy acid and its anhydride, or of the anhydride alone, in the presence of a small amount of mineral acid with hydrogen peroxide or the peracid of the esterifying acid.

Arylmercaptochloroacetic acids may be prepared by treating the arylmercaptoacetic acid in a solvent, for example, carbon tetrachloride or acetic acid, with sulphuryl-chloride, preferably keeping the temperature below about 70° C.

Arylmercaptobromoacetic acids (in which the aryl group contains a para substituent) may be obtained by treating the arylmercaptoacetic acid in a solvent, for example carbon tetrachloride, with bromine, preferably keeping the temperature below about 70° C.

Di(arylmercapto) acetic acids may be prepared in one step, by oxidizing an arylmercaptoacetic acid in a solvent, for example, boiling concentrated acetic acid, and preferably, with a mineral acid catalyst. Alternatively, such products may be prepared by boiling a solution of an arylmercaptoacyloxyacetic acid in a solvent, for example, boiling concentrated acetic acid. Alternatively, this same type of product may be obtained by interacting an arylmercaptohydroxyacetic acid in a solvent, for example, acetic acid with a little water, and preferably with some mineral acid catalyst. An arylsulphinylacetic acid or an arylmercaptohaloacetic acid may replace the arylmercaptoacyloxyacetic acid.

Further, acyl-substituted arylmercapto acetones may be obtained by interacting an acyl chloride with an arylmercaptoacetone in a solvent, for example, carbon disulphide at a temperature from about 0 to about 40° C., (based on the sulphide), in the presence of a Friedel-Crafts catalyst, for example with 1 to 4 molar equivalents of aluminum chloride. The carbon disulphide mixture may be in admixture with a small proportion of nitrobenzene to ease the stirring. The acylchloride may be replaced with the anhydride of its acid, by making the necessary adjustment in the amount of the Friedel-Crafts catalyst.

The substituted (e.g. acylated, chloroalkylated or halogenated) arylmercaptoacetic acid (or the acetonitrile) may further be subjected to the step of breaking up the sulphide bond by oxidative hydrolysis. This last step consists essentially of two reactions occurring in rapid sequence one of oxidation of the sulphide function to sulphoxide followed, in suitable solvents, by hydrolysis. In certain conditions it is possible to separate the two reactions and to obtain, e.g. the aromatic sulphinyl acetic acid without the hydrolysis. Thus, the arylsulphinylacetic acids may be prepared by interacting a suspension of arylmercaptoacetic acid with water with hydrogen peroxide below about 80° C., for example, about 60° C., in the absence of mineral acids. Refluxing a solution of the alkali salt of the arylmercaptoacetic acid at a pH of 7 to 10, with excess hydrogen peroxide will lead to a solution of the sulphinyl compound. Acetone at room temperature or 60%–80% aqueous acetic acid at 80° C. may, if desired, be used instead of wholly aqueous media. Acetone may, if desired, be used instead of acetic acid. An aqueous solution of the sodium salt of arylmercaptoacetic acid may be employed with an excess of oxidizing agent.

The arylsulphinylacetic acid, or the corresponding substituted (e.g. acylated, or chloroalkylated or halogenated) arylsulphinylacetic acid may then be hydrolyzed to the corresponding thiol by heating in the presence of strong mineral acid in an aqueous or aqueous organic solvent solution.

Example 1

Phenyl mercaptan, $C_6H_5SH$, is condensed in known fashion with chloroacetic acid in excess aqueous alkali and the product is obtained as solid phenylmercaptoacetic acid, $C_6H_5SCH_2COOH$, M. 62°–63° C. by suitable isolation. This is reacted in known fashion (e.g. Swiss Patent 168,619 (1934)) with sulphuryl chloride in the presence of antimony pentachloride catalyst in chlorobenzene medium to form p - chlorophenylmercaptoacetic acid, $p\text{-}ClC_6H_4SCH_2COOH$, M. 104°–105° C. in high yield.

To a suitable reaction flask-fitted for a steam distillation, p - chlorophenylmercaptoacetic acid (0.1 mole), water (200 ml.), and concentrated sulphuric acid (5–10 ml.) are charged. This is brought to the boil under stirring, and steam is passed through. Hydrogen peroxide, $H_2O_2$, (22.8 ml. of 30% aqueous solution, 0.2 mole) is added slowly over a period of about 60 minutes. Steam distillation is continued after addition until the distillate no longer contains oily thiol droplets—about 30 minutes. Zinc dust (2 g.) is carefully added, and steam distillation resumed, again to the non-appearance of thiol in the distillate. This latter process reduces back to thiol any disulphide formed during the oxidation stage. Ether extraction removes the thiol from the distillate. Separation of the ether layer, drying, removal of the ether, and distillation give solid p-chlorophenyl mercaptan, $p\text{-}ClC_6H_4SH$, M. 50–52° C. in a yield of about 85%.

Other oxidants, e.g. dilute nitric acid, potassium dichromate, potassium permanganate, or halogens may replace $H_2O_2$.

In like fashion, p-tolylmercaptan, $p\text{-}CH_3C_6H_4SH$, forms p-tolylmercaptoacetic acid, $p\text{-}CH_3C_6H_4SCH_2COOH$, which is brominated, e.g. by bromine in acetic acid, to give o-bromo-p-tolylmercaptoacetic acid,

M. 120–121° C., and this is oxidatively cleaved using $H_2O_2$ to give a 90% yield of o-bromo-p-tolylmercaptan, $2\text{-}Br\text{-}4\text{-}CH_3C_6H_3SH$, B. 60–62° C./0.5 mm.

Instead of chloroacetic acid, chloroacetone or chloroacetonitrile may be used to form arylmercaptoacetones, $ArSCH_2COCH_3$, or arylmercaptoacetonitriles,

to replace the arylmercaptoacetic acids in the subsequent steps of the general process. The exact procedures will vary depending on the protective group used, the substituent to be introduced and the nature of the final product.

Example 2

To a vigorously stirred suspension of anhydrous aluminum chloride (4.1 mole) in carbon disulphide (16 moles) at 0–5° C. acetyl chloride (1.1 moles) is added gradually. With temperature held at about 10° C., solid phenylmercaptoacetic acid (1 mole) is gradually added. To ease stirring during this addition, small amounts of nitrobenzene, to a total of about 1 mole, are added. After mercaptoacid addition, stirring is continued until HCl evolution substantially stops (about 3 hours), during which period the temperature is allowed to become ambient. The resulting mixture is decomposed by use of ice-HCl, filtered, the product on the filter washed with water, removed, suspended in a large amount of warm benzene or warm petroleum ether (B. 60° C.), re-filtered, washed well with petroleum ether, dried. There is thus obtained:
(1) p-acetylphenylmercaptoacetic acid,

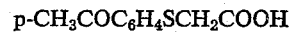

M. 156°–158° C., in a yield of about 96%.

Acetic anhydride may replace acetylchloride, petroleum ether or carbon tetrachloride may replace carbon disulphide, and esters of the mercapto acid may be used in place of the mercapto acid.

Among other examples, similarly obtained were:

(2) 4-benzoylphenylmercaptoacetic acid
4-$C_6H_5COC_6H_4SCH_2COOH$, M. 134°–135° C., 90% yield.
(3) 4-acetyl-2-methylphenylmercaptoacetic acid,
4-$CH_3CO$-2-$CH_3C_6H_3SCH_2COOH$, M. 118°–119° C., 90% yield.
(4) 2-acetyl-4-methylphenylmercaptoacetic acid,
2-$CH_3CO$-4-$CH_3C_6H_3SCH_2COOH$, M. 161°–162° C., 70% yield.
(5) 4-benzoyl-3-methylphenylmercaptoacetic acid,
4-$C_6H_5CO$-3-$CH_3C_6H_3SCH_2COOH$, M. 102°–103° C., 52% yield.

All of these substituted-arylmercaptoacetic acids are amenable to the oxidative acid-catalyzed cleavage of Example 1—although steam distillation is not generally feasible because of low volatility—and good yields of the corresponding substituted-aryl thiol mixed with its disulphide were obtained. Thus (1) gives 4-$CH_3COC_6H_4SH$, B. 135°–136° C./7 mm. and (4-$CH_3COC_6H_4S)_2$, M. 97°–98° C.
(2) gives 4-$C_6H_5COC_6H_4SH$, M. 71°–72° C. and (4-$C_6H_5COC_6H_4S)_2$, M. 126°–127° C.
(3) gives 4-$CH_3CO$-2-$CH_3C_6H_3SH$, B. 146°–147° C./6 mm. and (4-$CH_3CO$-2-$CH_3C_6H_3S)_2$, M. 112°–113° C.
(4) gives 2-$CH_3CO$-4-$CH_3C_6H_3SH$, B. 139°–140° C./5.5 mm. and (2-$CH_3CO$-4-$CH_3C_6H_3S)_2$.
(5) gives 4-$C_6H_5CO$-3$CH_3C_6H_3SH$, B. 152° C./2 mm. and (4-$C_6H_5CO$-3$CH_3C_6H_3S)_2$.

The disulphides were also reduced to the corresponding thiols. It is also possible to prepare the acrylarylsulphinylacetic acids using one equivalent of $H_2O_2$ on the mercapto acids, followed by isolation; hydrolysis of the sulphinyls in boiling dilute mineral acids gives moderate yields of the corresponding acrylaryl thiols.

*Example 3*

Finely-powdered phenylmercaptoacetic acid (45 parts) are suspended in concentrated HCl (115 parts). Concentrated sulphuric acid (4 parts) and formaldehyde (18 parts) are added, and the mixture is stirred at 40°–50° C. Hydrogen chloride gas is passed in for six hours and the mixture is allowed to stand overnight. The solid product is filtered off and dried, then extracted in a Soxhlet, using petroleum ether. The ether deposits needles of p-chloromethylphenylmercaptoacetic acid, p-$ClCH_2C_6H_4SCH_2COOH$ which may be subjected to the oxidative cleavage exemplified in Example 1.

*Example 4*

Not removing the thiol as formed and using about two equivalents of oxidant leads to the corresponding disulphide: p-bromophenylmercaptoacetic acid (6.2 parts) in water (30 parts) boiled under reflux while 70% nitric acid (2.25 parts) in water (19 parts) is added over 40 minutes resulted in di-(p-bromophenyl)disulphide, [p-$BrC_6H_4S]_2$, (2–1 parts), M. 95°–96° C. and some unreacted material.

Still more oxidant (4.5 parts nitric acid) leads to a further oxidation stage, the arylthiol arylsulphonate, 3.3 parts of solid being recovered which is resolvable into 0.6 part p - bromophenylthio-p-bromophenylsulphonate p-$Br$-$C_6H_4SO_2SC_6H_4Br$-p (insoluble in petroleum ether) and 2.6 parts of the above disulphide (relatively soluble in petroleum ether). The proportion of arylsulphonate may be further increased by use of still more oxidant and longer reflux in a homogeneous medium, e.g. acetic acid.

*Example 5*

Instead of using the arylmercaptoacetic acid, the succeeding oxidation stage, arylsulphinylacetic acid, may be prepared, isolated, and cleaved with acid to the thiol. Thus, phenylmercaptoacetic acid (16–8 parts) was treated with 30% hydrogen peroxide (11 parts) gradually with stirring and cooling to keep the temperature at about 40° C. When a clear viscous yellow liquid stage was reached and there was no further tendency for spontaneous temperature rise about 40° C., the volatiles were removed under vacuum at about 60° C. to leave a white solid. Digestion with warm ether left a 94% yield of phenylsulphinylacetic acid $C_6H_5SOCH_2COOH$, M. 110°–112° C.

Acetone, methylethylketone, or aqueous acetic acid can be used as solvent in the foregoing procedure to give a homogeneous rather than a heterogeneous reaction medium at the start.

The phenylsulphinylacetic acid thus formed may be steam distilled in the presence of dilute aqueous mineral acid or acetic acid to give a high yield of phenyl mercaptan. Among other arylsulphinyls thus prepared for eventual cleavage with acid were:

4-acetylphenylsulphinylacetic acid,
4-$CH_3COC_6H_4SOCH_2COOH$, M. 136°–137°

4-acetyl-2-methylphenylsulphinylacetic acid,
4-$CH_3CO$-2-$CH_3C_6H_3SOCH_2COOH$, syrup 2-acetyl-4-methylphenylsulphinylacetic acid,
2 - $CH_3CO$ - 4 - $CH_3C_6H_3SOCH_2COOH$, M. 181°–182° (dec.).

4-benzoyl-3-methylphenylsulphinylacetic acid,
4-$C_6H_5CO$-3-$CH_3C_6H_3SOCH_2COOH$, syrup When in the acylation or halogenation steps relatively mild conditions and no catalyst were used, various side-chain-substituted products of the general formula Ar—S—CHX—COOH were obtained and isolated (wherein X represents the radicals

respectively):

(1) p-bromophenylmercaptoacetoxyacetic acid,

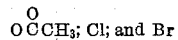

from the corresponding mercapto acid with acetic anhydride —$H_2O_2$
(2) p-tolylmercaptochloroacetic acid,

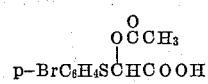

from the mercapto acid with sulphurylchloride in cold $CCl_4$
(3) p-bromophenylmercaptobromacetic acid,

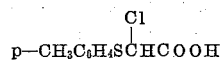

from the mercapto acid with bromine in cold $CCl_4$.

These side-chain-substituted intermediates, including the corresponding arylsulphinylacetic acids

and the isomeric arylmercaptohydroxyacetic acids

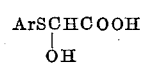

are subject to hydrolytic attack under reflux in dilute aqueous mineral acid to give good yields of di-(arylmercapto) acetic acids.

Thus

or C₆H₅SCH₂COOH—H₂O₂ (in equivalent amounts), under reflux in aqueous H₂SO₄ gave di(phenylmercapto) acetic acid

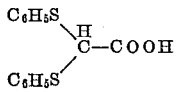

similarly, (1) gives di-(p-bromophenylmercapto)acetic acid $$(p\text{—}Br\text{—}C_6H_4S)_2CHCOOH$$

M. 189° C.

(2) gives di-(p-tolylmercapto)acetic acid $$(p\text{—}CH_3C_6H_4S)_2CHCOOH$$

M. 127° C.

(3) gives di-(p-bromophenylmercapto)acetic acid $$(p\text{—}BrC_6H_4S)_2CHCOOH$$

M. 189° C.

We claim:

1. Process for preparing substituted thiophenols having the formula:

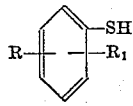

wherein R represents a radical selected from the group consisting of chlorine, bromine, carboxyacyl radicals and the chloromethyl radical and R₁ represents a radical selected from the group consisting of hydrogen and lower alkyl which comprises: reacting an aromatic thiol of the formula:

wherein R₁ is as defined above, with a compound of the formula:

wherein

X represents a radical selected from the group consisting of hydrogen, alkyl radicals and aryl radicals, and Y is an electron-withdrawing radical selected from the group consisting of (a) —COOR' in which R' is selected from the group consisting of hydrogen and lower alkyl, (b) —COR" in which R" is a lower alkyl radical, and (c) —CN thereby to obtain a compound of the formula:

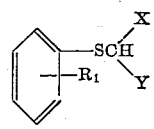

wherein X, Y and R₁ are as defined above, subjecting the compound thus obtained to a substitution reaction by reacting with a substituting agent selected from the group consisting of chlorinating agents, brominating agents, acylating agents together with a Friedel-Crafts catalyst, said acylating agents being selected from the group consisting of carboxyacyl chlorides and carboxyacyl anhydrides and chloromethylating agents to introduce the corresponding substituent onto the benzene ring, thus forming a compound of the formula:

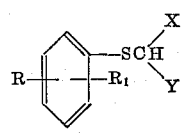

wherein R, R₁, X and Y are as defined above, and subjecting the compound thus obtained to oxidative acid-catalyzed hydrolysis by reaction with an oxidizing agent selected from the group consisting of hydrogen peroxide, potassium permanganate, potassium dichromate, nitric acid and halogens and an acid.

2. Process as defined in claim 1, wherein said acid is selected from the group consisting of hydrochloric acid, sulphuric acid, phosphoric acid, and acetic acid.

3. Process as defined in claim 1, wherein said chlorinating agent is sulphuryl chloride with antimony pentachloride catalyst.

4. Process as defined in claim 1, wherein said brominating agent is bromine.

5. Process as defined in claim 1, wherein said Friedel-Crafts catalyst is aluminum chloride.

6. Process as defined in claim 5, wherein said acylating agent is selected from the group consisting of benzoyl chloride and acetyl chloride and anhydrides thereof.

7. Process as defined in claim 1, wherein said chloromethylating agent is formaldehyde and hydrochloric acid.

8. Process as defined in claim 1, wherein the compound of the formula

is selected from the group consisting of relatively low molecular weight α-chloro-alkanoic acids, low molecular weight α-chloro-ketones and low molecular weight α-chloro-nitriles.

9. Process as defined in claim 1, wherein said oxidizing agent is used in a proportion of from one to one and one-half moles based on the sulphide.

References Cited by the Examiner

Overberger et al.: J. Am. Chem. Soc. 78, 4792–7 (1956).

LEON ZITVER, *Primary Examiner.*

D. D. HORWITZ, *Assistant Examiner.*